United States Patent
Xiao et al.

(10) Patent No.: US 11,231,864 B2
(45) Date of Patent: Jan. 25, 2022

(54) MEMORY ACCESS TECHNOLOGY AND COMPUTER SYSTEM

(71) Applicant: HUAWEI TECHNOLOGIES CO., LTD., Guangdong (CN)

(72) Inventors: Shihai Xiao, Moscow (RU); Florian Longnos, Shenzhen (CN); Wei Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 16/927,066

(22) Filed: Jul. 13, 2020

(65) Prior Publication Data
US 2020/0393965 A1    Dec. 17, 2020

Related U.S. Application Data (63) Continuation of application No. 16/284,609, filed on Feb. 25, 2019, now Pat. No. 10,732,876, which is a
(Continued)

(51) Int. Cl.
  *G06F 3/06*   (2006.01)
  *G06F 12/06*  (2006.01)
  *G06F 13/16*  (2006.01)

(52) U.S. Cl.
  CPC .......... *G06F 3/064* (2013.01); *G06F 3/0604* (2013.01); *G06F 3/0679* (2013.01);
(Continued)

(58) Field of Classification Search
  None
  See application file for complete search history.

(56) References Cited

U.S. PATENT DOCUMENTS

| | | | |
|---|---|---|---|
| 8,769,192 B2 * | 7/2014 | Yeh | ........... G06F 12/0246 711/103 |
| 8,793,343 B1 | 7/2014 | Sorenson, III et al. | |

(Continued)

FOREIGN PATENT DOCUMENTS

| | | |
|---|---|---|
| CN | 101876944 A | 11/2010 |
| CN | 102414666 A | 4/2012 |

(Continued)

OTHER PUBLICATIONS

Proposed DDR5 NVDIMM-P Bus Protocol, JC-45.6, 2261.13D Ballot Template Version draft rev. Aug. 11, 2011, 60 pages.
(Continued)

*Primary Examiner* — Brian R Peugh (57) ABSTRACT

A computer system includes a memory controller and a non-volatile dual in-line memory module (NVDIMM) connected to the memory controller. The NVDIMM comprises a non-volatile memory (NVM) for storing data and a media controller. After receiving a read command for reading first data stored in the NVDIMM from the memory controller, the media controller reads multiple data subblocks of the first data from the NVM. After sending multiple ready signals to notify the memory controller that multiple data subblocks of the first data are available, the media controller receives multiple send commands for fetching the multiple data subblocks. The media controller then transmits to the memory controller the multiple data subblocks in response to the multiple send commands.

28 Claims, 5 Drawing Sheets

Related U.S. Application Data continuation of application No. PCT/CN2017/089774, filed on Jun. 23, 2017.

(52) U.S. Cl.
CPC ...... *G06F 12/0646* (2013.01); *G06F 13/1673* (2013.01); *G06F 3/067* (2013.01)

(56) References Cited

U.S. PATENT DOCUMENTS

| | | |
|---|---|---|
| 9,294,564 B2 | 3/2016 | Sorenson, III et al. |
| 2006/0149872 A1 | 7/2006 | Natarajan et al. |
| 2010/0287446 A1 | 11/2010 | Post et al. |
| 2011/0041039 A1 | 2/2011 | Harari et al. |
| 2011/0125961 A1 | 5/2011 | Ding |
| 2015/0006841 A1 | 1/2015 | Chen et al. |
| 2015/0309924 A1 | 10/2015 | Chen et al. |
| 2015/0339062 A1 | 11/2015 | Toyoda et al. |
| 2015/0347048 A1 | 12/2015 | Pawlowski |
| 2015/0363106 A1 | 12/2015 | Lim et al. |
| 2016/0085585 A1 | 3/2016 | Chen et al. |
| 2016/0217835 A1 | 7/2016 | Blott et al. |
| 2016/0266823 A1 | 9/2016 | Hong |
| 2017/0017412 A1 | 1/2017 | Luan et al. |
| 2017/0322726 A1 | 11/2017 | Walker et al. |
| 2018/0052639 A1* | 2/2018 | Woo .......................... G11C 7/20 |
| 2018/0059933 A1 | 3/2018 | Helmick et al. |

FOREIGN PATENT DOCUMENTS

| | | |
|---|---|---|
| CN | 102609378 A | 7/2012 |
| CN | 103034603 A | 4/2013 |
| CN | 104375946 A | 2/2015 |
| CN | 106471485 A | 3/2017 |
| CN | 106843772 A | 6/2017 |
| EP | 2801912 A1 | 11/2014 |
| JP | 2015508546 A | 3/2015 |
| JP | 2016520233 A | 7/2016 |
| WO | 2016122762 A1 | 8/2016 |
| WO | 2017192346 A1 | 11/2017 |

OTHER PUBLICATIONS

Qiu Xuehong et al. Microcomputer Principle and Interface Technology,the third edition Xi"an University of Electronic Science and Technology Press.2015. Total 10 pages. With Partial English translation.

* cited by examiner

| Function | CS | Command/Address Signal Rising CLK_t | | | | | | | Command/Address Signal Falling CLK_t | | | | | | |
|---|---|---|---|---|---|---|---|---|---|---|---|---|---|---|---|
| | | CA0 | CA1 | CA2 | CA3 | CA4 | CA5 | CA6 | CA0 | CA1 | CA2 | CA3 | CA4 | CA5 | CA6 |
| XREAD | L | L | L | L | Length[2:0] | | | RFU | RFU | ADDR[11:5] | | | | | |
| | H | ADDR[4:1] | | | | RID[9:7] | | | RID[6:0] | | | | | | |

MEMORY ACCESS TECHNOLOGY AND COMPUTER SYSTEM

CROSS-REFERENCE TO RELATED APPLICATIONS

This application is a continuation of U.S. patent application Ser. No. 16/284,609, filed on Feb. 25, 2019, which is a continuation of International Patent Application No. PCT/CN2017/089774, filed on Jun. 23, 2017. The aforementioned patent applications are hereby incorporated by reference in their entirety.

TECHNICAL FIELD

This application relates to the field of computer technologies, and in particular, to a memory access technology and a computer system.

BACKGROUND

A non-volatile dual in-line memory module (NVDIMM) is a random access memory (RAM) of a computer. The NVDIMM may include a plurality of non-volatile memory (NVM) chips. The NVDIMM can still store complete memory data when a system is completely powered off. It may be understood that the NVM chip on the NVDIMM may be a non-volatile RAM (NVRAM). The NVM on the NVDIMM may include a phase change memory (PCM), a resistive RAM (RRAM), a magnetic RAM (MRAM), a spin-transfer torque MRAM (STT-MRAM), or the like. The NVDIMM communicates with a memory controller using the NVDIMM-P protocol. The NVDIMM-P protocol is a bus access protocol compatible with the double data rate (DDR) protocol.

A person skilled in the art may know that, a processor usually has a read requirement for reading data with different length. Therefore, the processor may send access requests for reading data with different length to the memory controller. For example, the processor may send, based on a requirement, an access request for reading 64 Bytes (B) data or an access request for reading 128B data to the memory controller. In other approaches, the memory controller usually sends a read command for reading fixed-length data to the NVDIMM. For example, in one case, the memory controller may send a read command for reading 64B data to the NVDIMM. In this case, when the memory controller receives an access request that is sent by the processor and used to read 128B data, the memory controller needs to split the access request into two 64B data read commands, and read, from the NVDIMM using the two read commands, the 128B data required by the processor. Such a processing manner wastes bandwidth of a command bus, and affects system performance. In another case, the memory controller sends only a read command for reading 128B data to the NVDIMM. In this case, when the memory controller receives an access request that is sent by the processor and used to read 64B data, the memory controller needs to change the access request for 64B data to a read command for 128B data, and sends the read command for 128B data to the NVDIMM. This manner wastes bandwidth of a data bus.

SUMMARY

A memory access technology and a computer system provided in this application can support read commands for reading data with different length without wasting bus bandwidth to improve system performance.

According to a first aspect, this application provides a computer system. The computer system includes a memory controller, a media controller, and an NVM connected to the media controller. The NVM is configured to store data. The memory controller is connected to the media controller. After the memory controller sends a first read command to the media controller, the media controller may read first data from the NVM based on a first address in the first read command. The first read command carries a first identifier (also referred to as ID), the first address, and a first length, the first ID is an identifier of the first read command, and the first length is used to indicate a size of the first data to be read by the first read command. The memory controller sends at least two send commands to the media controller, where the at least two send commands are used to obtain at least two pieces of data of a third length, and the third length is less than the first length. The media controller, in response to the at least two send commands, returns at least two data subblocks of the third length and metadata of the at least two data subblocks to the memory controller. The metadata includes the first ID and a location identifier, and the location identifier is used to indicate an offset of a corresponding data subblock in the first data. The memory controller combines the at least two data subblocks into the first data based on location identifiers in the metadata of the at least two data subblocks.

When receiving an access request for obtaining relatively large data, the computer system provided in this application may support an access request of the system without adding a read command in order to reduce waste of bus bandwidth and improve system performance.

In actual application, the location identifier is at least one bit. The memory controller communicates with the media controller by complying with the NVDIMM-P protocol.

With reference to the first aspect, in a first possible implementation, the memory controller is further configured to send a second read command to the media controller, where the second read command carries a second ID, a second address, and a second length, and the second length is used to indicate a size of second data to be read by the second read command. The media controller is further configured to obtain the second data from the NVM based on the second address. The memory controller is further configured to send a second send command to the media controller, where the second send command is used to obtain a data block of the third length, and the second length is equal to the third length. The media controller is further configured to in response to the second send command, return the second data and metadata of the second data to the memory controller, where the metadata of the second data carries the second ID.

The computer system provided in this application can support a read requirement for reading data with different length without increasing a quantity of read commands and without wasting bus bandwidth, thereby improving system performance.

With reference to the first aspect or the first possible implementation of the first aspect, in a second possible implementation, the media controller is further configured to divide the first data read from the NVM into the at least two data subblocks for temporarily storing, and record the metadata of the at least two data subblocks.

With reference to the first or the second possible implementation of the first aspect, in a third possible implementation, metadata of each data subblock further includes a transmission identifier, and the transmission identifier is used to indicate whether the data subblock is a last to-be-transmitted data subblock of the first data. The computer system further includes a buffer, and the buffer is configured to temporarily store at least two data subblocks of the first data read from the NVM and the second data. The media controller is further configured to send the second data to the memory controller ahead of the first data subblock when the second data is located after a first data subblock of the first data in the buffer and located before a second data subblock of the first data in the buffer. A transmission identifier of the first data subblock indicates that the first data subblock is not the last to-be-transmitted data subblock of the first data, and a transmission identifier of the second data subblock indicates that the second data subblock is the last to-be-transmitted data subblock of the first data.

According to the computer system provided in this application, because metadata of a data subblock returned by the media controller to the memory controller carries a transmission identifier, in a process of returning data to the memory controller by the media controller, a sending sequence of sending the data subblock to the memory controller can be adjusted based on the transmission identifier. This not only can process read commands for reading data with different length, but also can reduce a wait delay in receiving data by the memory controller, thereby further improving processing efficiency of the computer system.

With reference to any one of the first aspect, or the first to the third possible implementations of the first aspect, in a fourth possible implementation, the computer system further includes a processor. The processor is configured to send a first access request to the memory controller. The first access request includes the first ID, the first address, and the first length. The memory controller is further configured to send the first read command to the media controller based on the first access request. In the computer system according to the possible implementation, even if an access request that is sent by the processor and used to read relatively large data is received, the access request sent by the processor is not changed to a read command for a plurality of pieces of small data. Therefore, in comparison with the other approaches, a quantity of read commands can be reduced, and bus bandwidth can be saved, thereby improving performance of the computer system.

According to a second aspect, this application provides a storage. The memory includes an NVM and a media controller connected to the NVM. The NVM is configured to store data. The media controller is configured to receive a first read command sent by a memory controller in a computer system, and read a first data from the NVM based on a first address in the first read command. The first read command carries a first ID, the first address, and a first length, the first ID is an identifier of the first read command, and the first length is used to indicate a size of the first data to be read by the first read command. After receiving at least two send commands sent by the memory controller, the media controller, in response to the at least two send commands, returns at least two data subblocks of a third length and metadata of the at least two data subblocks to the memory controller. The at least two send commands are used to obtain data of the third length, and the third length is less than the first length. Metadata of each data subblock includes the first ID and a location identifier. The location identifier is used to indicate an offset of a corresponding data subblock in the first data such that the at least two data subblocks can be combined into the first data based on location identifiers in the at least two data subblocks.

With reference to the second aspect, in a first possible implementation, the media controller is further configured to receive a second read command sent by the memory controller, and obtain second data from the NVM based on a second address in the second read command. The second read command carries a second ID, the second address, and a second length, and the second length is used to indicate a size of the second data to be read by the second read command. After receiving a second send command sent by the memory controller, the media controller, in response to the second send command, returns the second data and metadata of the second data to the memory controller. The second send command is used to obtain a data block of the third length, where the second length is equal to the third length, and the metadata of the second data carries the second ID.

With reference to the second aspect or the first possible implementation of the second aspect, the memory further includes a buffer, and the buffer is configured to temporarily store the at least two data subblocks of the first data that is read by the media controller from the NVM. The media controller is further configured to record the metadata of the at least two data subblocks.

With reference to the first or the second possible implementation of the second aspect, in a third possible implementation, the metadata of each data subblock further includes a transmission identifier, and the transmission identifier is used to indicate whether the data subblock is a last to-be-transmitted data subblock of the first data. The buffer is further configured to temporarily store the second data. The media controller is further configured to send the second data to the memory controller ahead of the first data subblock when the second data is located after a first data subblock of the first data in the buffer and located before a second data subblock of the first data in the buffer. A transmission identifier of the first data subblock indicates that the first data subblock is not the last to-be-transmitted data subblock of the first data, and a transmission identifier of the second data subblock indicates that the second data subblock is the last to-be-transmitted data subblock of the first data.

According to a third aspect, this application provides a memory access method, and the method is applied to the computer system provided in the first aspect or any possible implementation of the first aspect to implement functions of the computer system provided in the first aspect or any possible implementation of the first aspect.

According to a fourth aspect, this application provides another memory access method. The method is performed by the media controller in the computer system provided in the first aspect or any possible implementation of the first aspect, to implement functions of the media controller in the computer system provided in the first aspect or any possible implementation of the first aspect.

According to a fifth aspect, this application provides another memory access method. The method is performed by the memory controller in the computer system provided in the first aspect or any possible implementation of the first aspect, to implement functions of the memory controller in the computer system provided in the first aspect or any possible implementation of the first aspect.

According to a sixth aspect, this application provides a memory controller. The memory controller includes a communications interface and a control circuit connected to the communications interface. The communications interface is configured to send a first read command to a media controller in a computer system, where the first read command carries a first ID, a first address, and a first length, the first ID is an identifier of the first read command, and the first length is used to indicate a size of first data to be read by the first read command. The communications interface is further configured to send at least two send commands to the media controller, and receive at least two data subblocks of a third length and metadata of the at least two data subblocks. The at least two data subblocks and the metadata are sent by the media controller in response to the at least two send commands. The at least two send commands are used to obtain at least two pieces of data of the third length, and the third length is less than the first length. The at least two data subblocks are obtained by the media controller from an NVM in the computer system based on the first address. Metadata of each data subblock includes the first ID and a location identifier, and the location identifier is used to indicate a location of a corresponding data subblock in the first data. The control circuit is configured to combine the at least two data subblocks into the first data based on location identifiers in the metadata of the at least two data subblocks.

With reference to the sixth aspect, in a first possible implementation of the sixth aspect, the communications interface is further configured to send a second read command to the media controller. The second read command carries a second ID, a second address, and a second length, and the second length is used to indicate a size of second data to be read by the second read command. Then the communications interface sends a second send command to the media controller, and receives the second data and metadata of the second data that are returned by the media controller based on the second send command. The second send command is used to obtain a data block of the third length, and the second length is equal to the third length. The second data is obtained from the NVM by the media controller based on the second address, and the metadata of the second data carries the second ID.

According to a seventh aspect, this application further provides a computer program product, including program code, and an instruction included in the program code is executed by a computer, to implement the method according to the third aspect, the fourth aspect, or the fifth aspect.

According to an eighth aspect, this application further provides a computer readable storage medium. The computer readable storage medium is configured to store program code, and an instruction included in the program code is executed by a computer to implement the method according to the third aspect, the fourth aspect, or the fifth aspect.

BRIEF DESCRIPTION OF DRAWINGS

To describe the technical solutions in some of the embodiments of the present disclosure more clearly, the following briefly describes the accompanying drawings describing the embodiments. The accompanying drawings in the following description show merely some embodiments of the present disclosure.

DESCRIPTION OF EMBODIMENTS

To make a person skilled in the art better understand the technical solutions in the present disclosure, the following clearly describes the technical solutions in the embodiments of the present disclosure with reference to the accompanying drawings in the embodiments of the present disclosure. The described embodiments are merely some but not all of the embodiments of the present disclosure.

Figure 1:
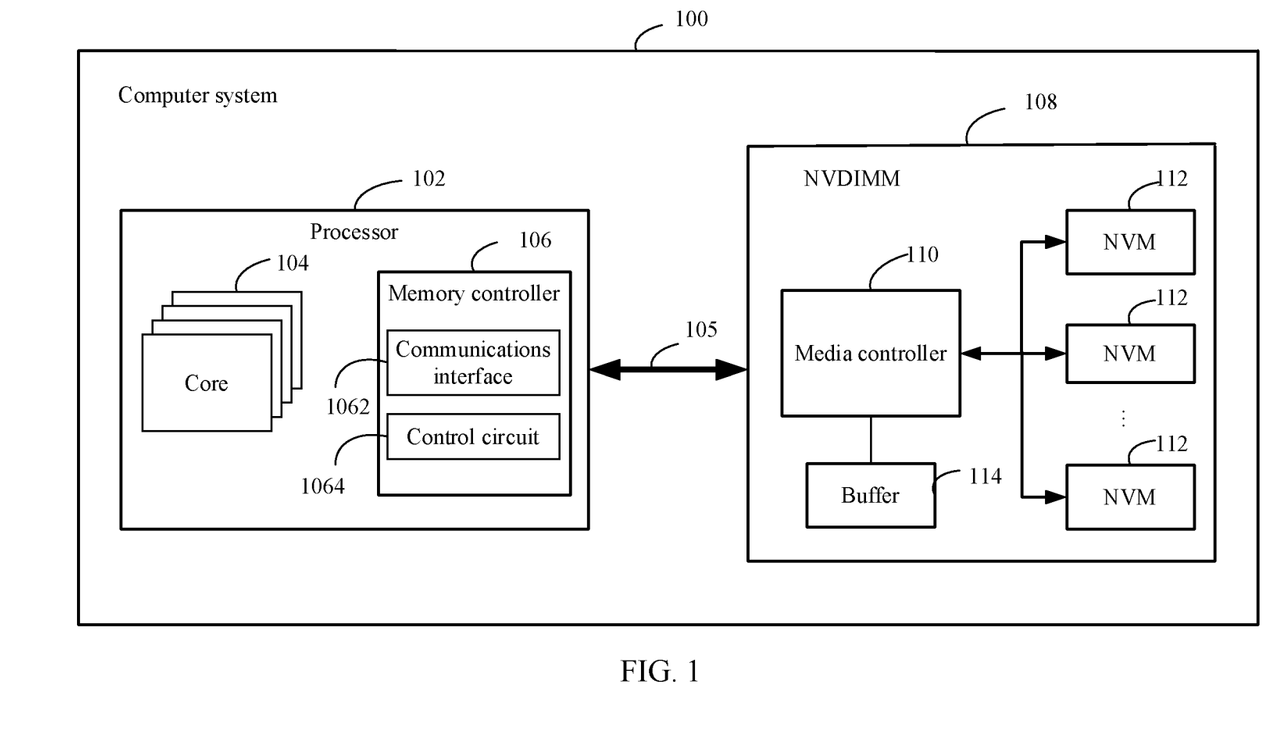
FIG. 1 is a schematic architectural diagram of a computer system according to an embodiment of the present disclosure.

FIG. 1 is a schematic architectural diagram of a computer system according to an embodiment of the present disclosure. As shown in FIG. 1, a computer system 100 may include at least a processor 102, a memory controller 106, and a NVDIMM 108. Usually, the memory controller 106 may be integrated into the processor 102. It should be noted that, in the computer system 100 provided in this embodiment of the present disclosure, in addition to devices shown in FIG. 1, the computer system 100 may include a communications interface and another device such as a disk that is used as an external storage. This is not limited herein.

The processor 102 is an operation core and a control unit of the computer system 100. The processor 102 may include a plurality of processor cores 104. The processor 102 may be a hyperscale integrated circuit. An operating system and another software program are installed on the processor 102 such that the processor 102 can access the NVDIMM 108, a buffer, and a disk. It may be understood that, in this embodiment of the present disclosure, a core 104 in the processor 102 may be, for example, a central processing unit (CPU), or may be another application-specific integrated circuit (ASIC).

The memory controller 106 is a bus circuit controller that is in the computer system 100 and that controls the NVDIMM 108 and is configured to manage and plan data transmission from the NVDIMM 108 to the core 104. Data may be exchanged between the NVDIMM 108 and the core 104 through the memory controller 106. The memory controller 106 may be a separate chip, and is connected to the core 104 through a system bus. A person skilled in the art may know that the memory controller 106 may alternatively be integrated into the processor 102 (as shown in FIG. 1), or built in a northbridge. A specific location of the memory controller 106 is not limited in this embodiment of the present disclosure. In an application, the memory controller 106 may include a communications interface 1062 and a control circuit 1064, and the memory controller 106 may communicate with the processor 102 and the NVDIMM 108 through the communications interface 1062. The memory controller 106 may control necessary logic using the control circuit 1064 to write data into the NVDIMM 108 or read data from the NVDIMM 108.

The NVDIMM 108 is a RAM of the computer system 100, and may be used as a memory or a storage in the computer system 100. The NVDIMM 108 may include a media controller 110, at least one NVM 112, and a buffer 134. The media controller 110 may include a logical circuit having a control capability. The NVM 112 is configured to store various software currently running on an operating system, input and output data, information that is exchanged with an external storage, and the like. The NVM 112 may exist in a chip form. As mentioned above, the NVM 112 may include an NVM that can be used as a memory, such as a PCM, an RRAM, an MRAM, or an STT-MRAM.

The memory controller 106 is connected to the NVDIMM 108 through a bus 105. The memory controller 106 communicates with the NVDIMM 108 by complying with the NVDIMM-P protocol. The NVDIMM-P protocol is a bus access protocol compatible with the DDR protocol. The media controller 110 may access, based on an access command of the memory controller 106, data stored in the NVM 112. It may be understood that, the access command sent by the memory controller 106 may be a read command or a write command. The media controller 110 may read data from the NVM 112 based on the read command sent by the memory controller 106. Alternatively, the media controller 110 may write data into the NVM 112 based on the write command sent by the memory controller 106.

The bus 105 in this embodiment of the present disclosure may include a data bus, a command/address bus, and a read data ready feedback bus. The data bus is configured to transmit data and metadata. The command/address bus is configured to transmit an access command such as a read command or a write command. The read data ready feedback bus is configured to send a ready signal that is used to notify the memory controller 106 that to-be-read data is ready in an NVDIMM. In actual application, when the memory controller 106 reads data from the NVDIMM 108 through the bus 105, the memory controller 106 first sends the read command based on the command/address bus. After the media controller 110 in the NVDIMM 108 obtains the to-be-read data from the NVM 112 based on a destination address in the read command, the NVDIMM 108 sends, to the memory controller 106 through the read data ready feedback bus, a ready signal that is used to notify that data is ready in the NVDIMM. After receiving the ready signal sent by the NVDIMM 108, the memory controller 106 sends, to the NVDIMM 108 through the command/address bus, a send command that is used to obtain data. After a fixed delay in sending the send command by the memory controller 106, the media controller 110 returns prepared data in a buffer of the NVDIMM 108 to the memory controller 106 through the data bus. Because the NVDIMM-P protocol supports out-of-order execution of an NVM read command, in actual application, when sending the send command, the memory controller 106 cannot determine a specific read command to which the data returned by the media controller 110 in response.

The buffer 114 is configured to temporarily store data read by the media controller 110 from the NVM 112. The buffer 114 may include a buffer queue. Usually, the buffer queue buffers data in a first in first out sequence. The media controller 110 may schedule data in the buffer 114 based on a sequence of data in the buffer 114. For example, the media controller 110 may send buffered data to the memory controller 106 or write the data into the NVM 112 based on a sequence of the data in the buffer queue. In this embodiment of the present disclosure, the media controller 110 may not schedule data in a first in first out sequence, but schedules data in the buffer queue based on a priority of the data or an application need. It may be understood that, in actual application, the NVDIMM 108 may further include a write buffer (not shown in FIG. 1) that is configured to temporarily store data to be written into the NVM 112.

A person skilled in the art may know that, because the NVDIMM-P bus protocol is compatible with the standard DDR bus protocol, a data bus in the NVDIMM-P bus protocol can be reused. In this manner, both a write command sent by the memory controller and the send command that is used to obtain data reuse a same data bus. Therefore, to prevent a conflict of commands on a bus, when sending a send command to the media controller, the memory controller needs to determine a transmission time of data returned based on the send command, to determine a time for sending a next command such that each access command can be precisely scheduled. However, the NVDIMM-P protocol supports out-of-order execution of an NVM read command. Therefore, in a process of processing read commands for accessing data with different length, when sending a send command, the memory controller cannot know a specific read command to which the data returned by the media controller 110 belongs, and therefore cannot know a length of data received by the memory controller. Further, when sending a send command, the memory controller cannot determine a transmission time of the returned data. Based on the foregoing reasons, as mentioned above, in the other approaches, the memory controller 106 usually sends a fixed-length read command to the NVDIMM 108. For example, the memory controller 106 sends, to the NVDIMM 108, a read command that is used to read 64B data or a read command that is used to read 128B data. A processor has a requirement for reading data with different length. Therefore, a manner in which the memory controller 106 sends a fixed-length read command to the NVDIMM 108 may cause an increase in a quantity of read commands or waste of bandwidth of the bus 105, affecting improvement of system performance. In addition, wear leveling usually needs to be performed within an NVDIMM based on a received access command. An increased quantity of commands may increase work of wear leveling, and consequently a memory access method in the other approaches is not conducive to improving system performance. Therefore, to save bandwidth and improve system performance, it is necessary to provide a computer system that can support reading of data with different length from the NVDIMM 108 by the memory controller 106.

Figure 2:
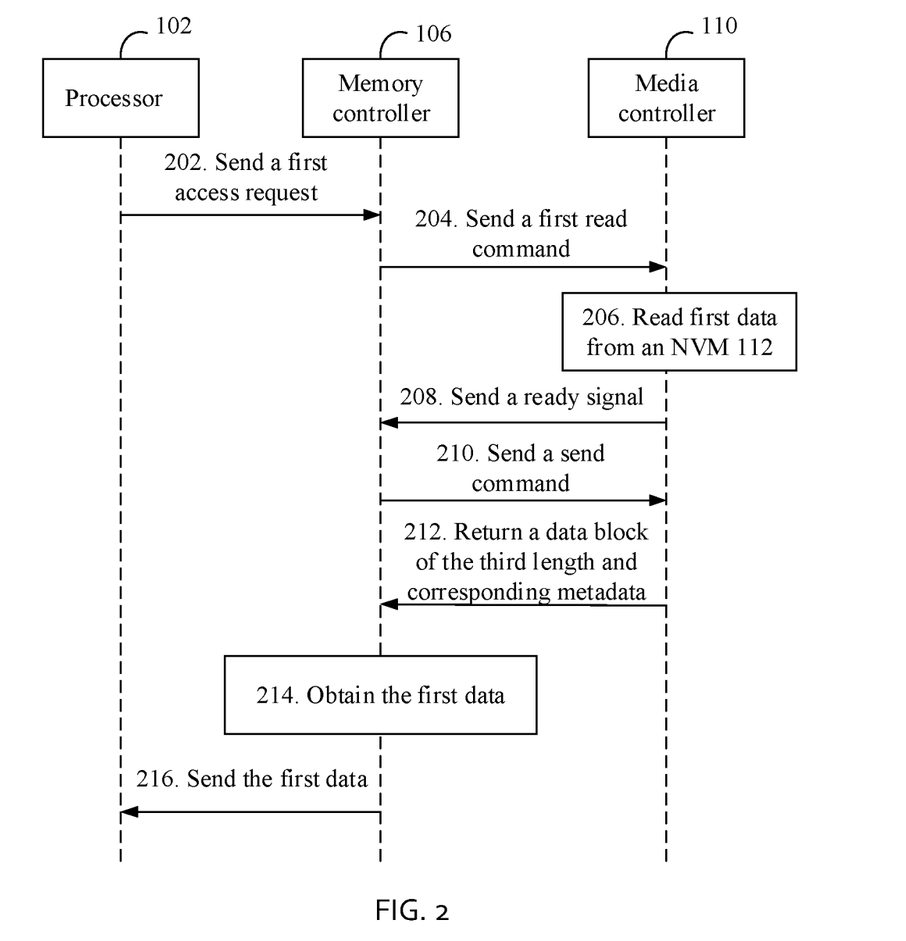
FIG. 2 is a signaling diagram of a memory access method according to an embodiment of the present disclosure.

The following describes, in detail with reference to FIG. 1, how the computer system 100 reads data with different length from the NVDIMM 108 based on different requirements. That is, the computer system 100 provided in the embodiments of the present disclosure can support a multi-length read command. To distinguish the read command in the embodiments from the read command in the other approaches, in this embodiment of the present disclosure, the read command sent by the memory controller 106 to the media controller 110 is referred to as an XREAD command. FIG. 2 is a signaling diagram of a data reading method according to an embodiment of the present disclosure. As shown in FIG. 2, the method may include the following steps.

Step 202: A processor 102 sends a first access request to a memory controller 106. The first access request carries a first logical address and a first length, the first length is used to indicate a size of first data to be read by the processor 102, and the first logical address is used to indicate an address of the to-be-read first data.

Step 204: The memory controller 106 sends a first read command to a media controller 110 based on the first access request, where the first read command carries a first ID, a first address, and the first length, and the first length is used to indicate the size of the first data to be read by the first read command. The first address is used to indicate a physical address of the first data in an NVM 112.

Figure 3:
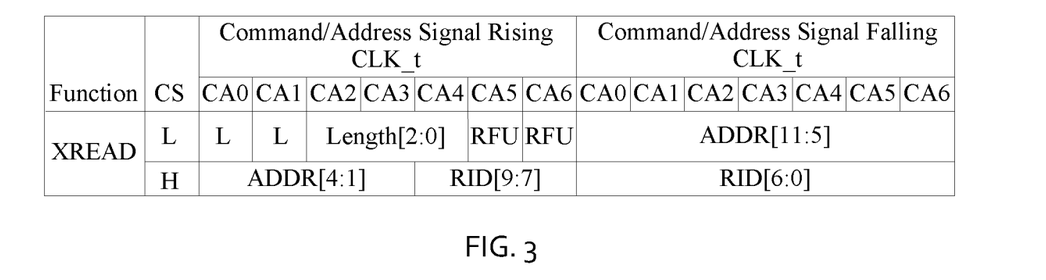
FIG. 3 is a schematic diagram of a data structure of a read command according to an embodiment of the present disclosure.

In this embodiment of the present disclosure, a format of the first read command may be shown in FIG. 3. FIG. 3 is a schematic diagram of a data structure of an XREAD command according to an embodiment of the present disclosure. An XREAD command is transmitted in two periods. A chip select (CS) signal in a first period is low (L), a second period follows the first period, and a chip select signal in the second period is high (H). Each period further includes a rising edge of a clock signal and a falling edge of the clock signal. As shown in FIG. 3, according to the NVDIMM-P protocol, both a rising edge and a falling edge of a command/address bus clock signal may be used to transmit data information. For example, as shown in FIG. 3, for information transmitted on the rising edge of the clock signal, refer to the "Command/Address Signal Rising CLK_t" part in FIG. 3. For information transmitted on the falling edge of the clock signal, refer to the "Command/Address Signal Falling CLK_t" part in FIG. 3. Further, the XREAD command provided in this embodiment of the present disclosure may include the following fields. A "CS" bit is a chip select signal field, and is used to indicate whether an NVDIMM is selected. A field Length[2:0] is used to indicate a length of data to be read by the XREAD command. Fields ADDR[11:5] and ADDR[4:1] are used to indicate an address of the data to be read by the XREAD command. Fields RID[9:7] and RID[6:0] are used to indicate an ID of the XREAD command. A field "RFU" is an unused reserved field. A person skilled in the art may know that, each field in the XREAD command shown in FIG. 3 may be transmitted through the command/address bus of the bus 105 shown in FIG. 1. The bus 105 complies with the NVDIMM-P protocol.

In this embodiment of the present disclosure, the first read command may include the first ID of the first read command, and the first ID is an identifier of the first read command. For example, the first ID may use the fields RID[9:7] and RID[6:0] in FIG. 3 for identification. In addition, the first read command may further include an address of to-be-read data. For ease of description, in this embodiment of the present disclosure, the address of the to-be-read data carried in the first read command is referred to as a first address. For example, the first address may use the fields ADDR[11:5] and ADDR[4:1] in FIG. 3 for identification. It should be noted that, the first address is a physical address of the first data in the NVM 112.

To make the computer system provided in this embodiment of the present disclosure support a multi-length read command of a processor, in the first read command sent by the memory controller 106 to the media controller 110, some fields may be further needed to indicate a length of the first data to be read by the first read command. For example, the field "Length[2:0]" in FIG. 3 may be used to indicate the length of the first data. In this manner, the field "Length[2:0]" may be used to indicate a quantity of 64B data blocks included in the data to be read by the memory controller 106. For example, as shown in FIG. 3, the field "Length[2:0]" may have three bits, and the field "Length[2:0]" may be indicated using 000 to 111. Correspondingly, the field "Length[2:0]" may be used to indicate that a length of the data to be read by the memory controller may be 64B to 512B. That is, based on a data format of the XREAD command shown in FIG. 3, the computer system 100 can support a read operation of reading 512B data once.

It should be noted that, the field "Length[2:0]" in FIG. 3 is merely an example, and does not intend to limit the length of the to-be-read data. In actual application, more reserved fields may be used to represent the length of the to-be-read data. For example, in actual application, the field "RFU" shown in FIG. 3 may be further used to indicate the length of the to-be-read data. In this case, a field that is used to indicate the length of the to-be-read data may include four bits, and the field can indicate values from 0000 to 1111. Data that can be read by the computer system 100 may be 64B×16=1024B. In addition, in this embodiment of the present disclosure, a granularity of 64B is used as an example for a size of to-be-read data indicated by the field "Length[2:0]". In this manner, the size of the to-be-read data is a multiple of 64B. In actual application, a granularity of 32B, 128B, or another size may alternatively be used for the size of the to-be-read data indicated by the field "Length[2:0]", and no limitation is imposed in this embodiment of the present disclosure.

Step 206: The media controller 110 reads the first data from the NVM 112 based on the first address. Further, the media controller 110 reads the first data from the NVM 112 based on the first address and the first length. After reading the first data, the media controller 110 may temporarily store the first data in a buffer. In this embodiment of the present disclosure, after reading the first data, the media controller 110 may buffer the first data in a blocking manner using a granularity of 64B as a unit. For example, if the first length is 128B, the first data may be divided into two 64B data blocks, and the two data blocks may be separately stored in a buffer 114 of the NVDIMM 108. In a process of storing each data block, an ID of a read command to which the data block belongs and a location of the data block in data to be read by the read command may be marked in each data block. For example, if the first length of the first data is 128B, the media controller 110 may divide the first data into a first data subblock and a second data subblock for storing, and record, in metadata information of the first data subblock, a first ID and a location of the first data subblock in the first data. The location of the first data subblock in the first data means an offset of the first data subblock in the first data. For example, if the first data subblock is most-significant 64B in the first data, and the second data subblock is least-significant 64B in the first data, location information of the first data subblock may be recorded as 1 in the metadata of the first data subblock, and location information of the second data subblock may be recorded as 0 in metadata of the second data subblock.

It may be understood that "0" and "1" are merely an example of a location identifier in metadata of a data block. It may be understood that a location indication bit in the metadata of the data block may be not merely one bit, and a field of a plurality of bits may be used to indicate a location of a data block in to-be-read data. For example, if a field of three bits is used to indicate a location of a data block, 000 to 111 may be used to respectively indicate eight different locations of data blocks in to-be-read data.

Step 208: The media controller 110 sends a ready signal to the memory controller 106. The ready signal is used to notify the memory controller 106 that the to-be-read data is stored in the buffer of the NVDIMM 108. A person skilled in the art may know that, because an access delay of an NVM is not fixed, the NVDIMM cannot return, in a manner of a dynamic RAM (DRAM), data to be read by a read command to the memory controller within a fixed time after receiving the read command. Therefore, a ready signal used for a data feedback in a process of reading data is defined in the NVDIMM-P protocol. This is also a difference between the NVDIMM-P protocol and the DDR bus protocol. The ready signal is used to notify the memory controller that the NVDIMM has prepared the data to be read by the memory controller. After receiving the ready signal, the memory controller may obtain the prepared data from the buffer of the NVDIMM using a send command.

Step 210: The memory controller 106 sends a send command to the media controller 110. The send command is used to read a data block of a third length temporarily store in the buffer of the NVDIMM. It should be noted that, when data is stored in the buffer of the NVDIMM, the media controller sends the ready signal to the memory controller 106. Because the NVDIMM-P protocol supports out-of-order execution of an NVM read command, in this case, the memory controller 106 cannot know a specific read command for which the NVDIMM prepares data. As mentioned above, in a case of processing a read command used for reading multi-length data, when sending the send command to the media controller 110, the memory controller 106 does not know a size of data to be obtained by the memory controller 106, and therefore cannot determine a transmission time of to-be-returned data. In this embodiment of the present disclosure to avoid disorder of commands on a bus, even if the access request sent by the processor can read data with different length, the memory controller 106 sends the send command in a manner of obtaining fixed-length (for example, the third length) data. In this manner, even if different access requests have different sizes of to-be-read data, because a length of data obtained once is fixed, a transmission time of data returned by the media controller 110 may be determined. Therefore, the memory controller 106 may send the send command to the media controller 110 based on a fixed data transmission time, to obtain to-be-read data from the NVDIMM. It may be understood that, the third length may be set according to actual application. In actual application, to save bandwidth, the third length may be 64B.

Figure 4:
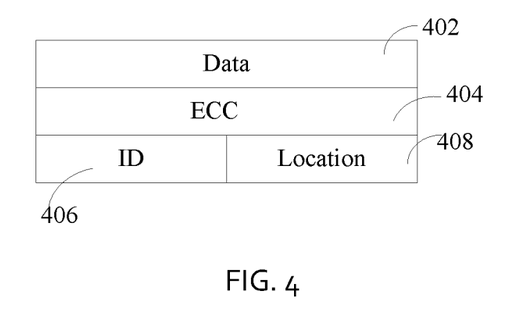
FIG. 4 is a schematic structural diagram of data returned by a media controller to a memory controller according to an embodiment of the present disclosure.

Step 212: The media controller 110 returns a data block of the third length and corresponding metadata to the memory controller 106 based on the send command. A person skilled in the art may know that, when receiving a send command, the media controller 110 returns a data block of a size of the same as the third length and corresponding metadata. Metadata of data is information used to describe the data. In an application, when returning the data to the memory controller 106 based on the send command, the media controller 110 usually returns the data block and the corresponding metadata together. For ease of description, in this embodiment of the present disclosure, the data block of the third length and corresponding metadata that are returned by the media controller 110 may alternatively be collectively referred to as returned data. A format of the data returned by the media controller 110 may be shown in FIG. 4. As shown in FIG. 4, the returned data may include the following information, data 402, an error correcting code (ECC) 404, an ID 406, and a location 408. The field data 402 is a data block of the third length. For example, the field data 402 may be a 64B data block. It may be understood that the third length may be set according to an actual need. For example, the third length may be set to 64B or 128B, provided that the third length is a fixed length. The field ECC 404 is used to indicate error correction information of the data block. In actual application, the field ECC 404 may occupy 12B. In addition, in actual application, the returned data may not include the field ECC 404. The field ID 406 is used to indicate a read command to which the data block belongs. For example, using the foregoing first read command as an example, if the first data to be read by the first read command is divided into a first data subblock and a second data subblock, in metadata of data blocks returned by the media controller 110 based on the two send commands sent by the memory controller 106, an ID of the first data subblock and an ID of the second data subblock each may be an ID of the first read command. The location 408 is used to indicate a location of a returned data subblock in the data to be read by the read command indicated by the ID 406. For example, when the media controller 110 returns the first data subblock, the location 408 may be "1", to indicate that the returned first data subblock is most-significant 64B in the data to be read by the first read command.

Figure 5:
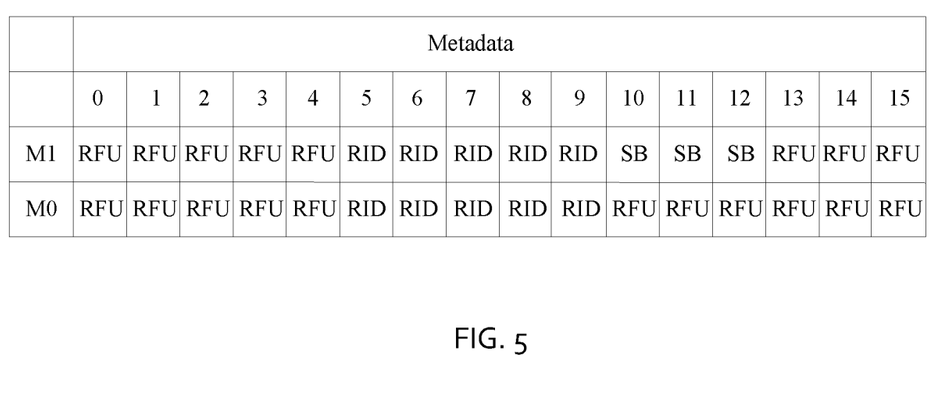
FIG. 5 is a schematic diagram of a data structure of metadata in data returned by a media controller to a memory controller according to an embodiment of the present disclosure.

In actual application, the field ECC 404, the field ID 406, and the field location 408 may be included in metadata of the returned data subblock. FIG. 5 is a schematic diagram of a data structure of metadata of a data block returned based on a send command according to an embodiment of the present disclosure. As shown in FIG. 5, M0 and M1 are used to indicate signals transmitted on two signal cables for transmitting metadata. A "RID" field is used to indicate a read command to which the data block belongs. That is, after receiving a data block returned by the media controller 110, the memory controller 106 may identify, based on the field "RID", a specific read command that reads the returned data block. A field "SB" is used to indicate an offset of the returned data block in data to be read by the read command indicated by the field "RID".

In the data structure shown in FIG. 5, that the RID occupies 10 bits and the SB occupies three bits is used as an example for description. RID information in the metadata corresponds to the fields RID[9:7] and RID[6:0] in the XREAD command shown in FIG. 3, and is used to indicate a read command to which a data subblock belongs. The three bits occupied by the SB correspond to the three bits in the "Length[2:0]" in the XREAD command shown in FIG. 3. In this manner, if Length[2:0]=7 in the XREAD command, this indicates that a length of data needing to be read is eight 64B data blocks. In the returned data block, if SB[2:0]=0, this indicates that the returned data subblock is a first data subblock in to-be-read data. If SB[2:0]=7, this indicates that the returned data subblock is an eighth data subblock in the to-be-read data. It may be understood that, in actual application, a quantity of bits occupied by the field ID 406 and the field location 408 may be set according to an actual need. No limitation is imposed in this embodiment of the present disclosure.

A person skilled in the art may know that, when there is data in the buffer 134 that is used to temporarily store to-be-returned read data and that is in the NVDIMM 108, the media controller 110 sends a ready signal to the memory controller 106. After receiving the ready signal sent by the media controller 110, the memory controller 106 sends a send command to the media controller 110. After receiving the send command, the media controller 110 returns a data block of the third length for the send command to the memory controller 106. Therefore, it may be understood that, when data to be read by a read command is relatively large, for example, greater than the specified third length, step 208 to step 212 need to be performed at least twice to completely read, from an NVDIMM, the data to be read by the read command. In this embodiment of the present disclosure, that the first data is of a length greater than the third length is used as an example. The memory controller needs to send at least two send commands to obtain the first data from the NVDIMM. For example, the memory controller 106 sends at least two send commands, and the media controller separately responds to the at least two send commands, to separately send at least two data subblocks of the first data to the memory controller 106.

Step 214: The memory controller 106 obtains the first data based on the received at least two data subblocks. Further, after receiving the data returned by the media controller 110 based on the send command, the memory controller 106 may determine, based on metadata of a returned data subblock, a read command to which the data subblock belongs. That the first data to be read by the first read command is of a length greater than the third length is used as an example in this embodiment of the present disclosure. After receiving at least two data subblocks including the first ID, the memory controller 106 may separately obtain a location of each data subblock in the first data based on a field SB in metadata of the at least two data blocks such that the memory controller 106 can obtain, based on an offset of each data subblock in the first data, the first data according to the at least two data subblocks including the first ID.

Step 216: The memory controller 106 sends the first data to the processor 102.

Figure 6:
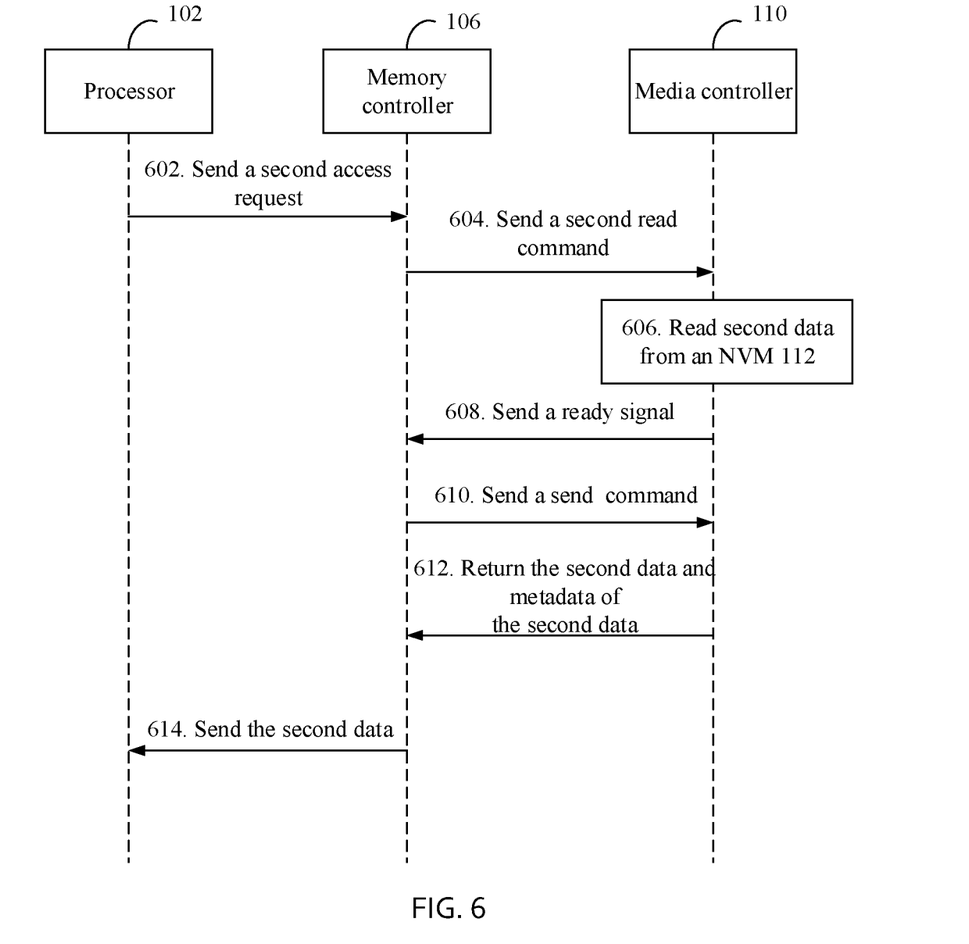
FIG. 6 is a signaling diagram of another memory access method according to an embodiment of the present disclosure.

In the embodiment shown in FIG. 2, how memory access is performed in the computer system 100 is described using an example of reading relatively large data. Because the computer system can support read commands for different requirements, the following describes, using another case as an example, a process of reading small data by the computer system 100. FIG. 6 is a signaling diagram of another memory access method according to an embodiment of the present disclosure. As shown in FIG. 6, the method may include the following steps.

Step 602: A processor 102 sends a second access request to a memory controller 106. The second access request includes a second length of to-be-read second data, where the second length is less than or equal to the third length. In this embodiment of the present disclosure, that the second data is of 64B is used as an example for description.

Step 604: The memory controller 106 sends a second read command to a media controller 110. The second read command includes a second ID, a second address, and the second length. A data format of the second read command may also be shown in FIG. 3. The second length is used to indicate a size of the second data to be read by the second read command.

Step 606: The media controller 110 reads second data from an NVM 112. Similar to step 206, the media controller 110 may read the second data from the NVM 112 based on the second address and the second length, and temporarily store the read second data in a buffer of an NVDIMM. In a process of storing the second data, both the second data and metadata of the second data need to be stored. The metadata of the second data may include an ID of the second read command and a location of the second data. Because the second data is relatively small, the media controller 110 does not need to temporarily store the second data in a blocking manner.

Step 608: The media controller 110 sends a ready signal to the memory controller 106.

Step 610: The memory controller 106 sends a send command to the media controller 110.

Step 612: The media controller 110 returns the second data and metadata of the second data to the memory controller 106. A format of the data returned by the media controller 110 may be shown in FIG. 4. The metadata of the second data may be shown in FIG. 5. Because a size of the second data is 64B, after the memory controller obtains the second data returned by the media controller 110, performs step 614.

Step 614: The memory controller 106 may directly send the second data to the processor 102.

It should be noted that, in this embodiment of the present disclosure, because a length of the second data is equal to a length of data that is read by the send command, when returning the second data, the media controller 110 may set a location identifier in the metadata of the second data to 000 to indicate that the second data has only one data block. In another case, when receiving the second data returned by the media controller 110, the memory controller 106 may learn, based on the second ID in the metadata of the second data, that the data belongs to the data to be read by the second read command, and further learn that a length of the second read command is equal to the third length. In this way, the memory controller 106 may know that the second data has only one data block such that the memory controller 106 may consider the location identifier in the metadata of the second data as a meaningless identifier.

The embodiment shown in FIG. 6 is similar to the embodiment shown in FIG. 2. Therefore, for details about related steps in the embodiment shown in FIG. 6, refer to description of a corresponding step in FIG. 2. Different from the embodiment shown in FIG. 2, because the second data to be read by the second access request is relatively small, the memory controller 106 may obtain the second data using one send command. Therefore, after the memory controller 106 determines, based on the metadata of the second data returned by the media controller 110, that the second data to be read by the second read command is completely returned, the memory controller may directly return the second data to the processor 102.

In actual application, the computer system 100 provided in this embodiment of the present disclosure may concurrently process a plurality of different read commands for accessing different NVM 112 chips. For example, the computer system 100 may concurrently process a first read command and a second read command. FIG. 2 and FIG. 6 are merely schematic diagrams of an execution method in which the computer system 100 processes read commands for reading data with different length. In addition, the computer system 100 provided in this embodiment of the present disclosure can further support out-of-order execution of a read command. In this manner, steps in FIG. 2 and steps in FIG. 6 may be performed crossly. For example, before step 208, the memory controller may perform step 604. When returning data to the memory controller 106, the media controller may first return a part of the first data read by the first read command shown in FIG. 2, or may first return the second data read by the second read command shown in FIG. 6. Therefore, in this embodiment of the present disclosure, an execution sequence of steps of the memory access methods shown in FIG. 2 and FIG. 6 is not limited.

In the computer system provided in the foregoing embodiment, when the processor 102 sends access requests that are used to read data with different length, the memory controller 106 may send, to the NVDIMM 108 based on the received access requests, read commands that are used to read data with different length. When sending the first read command that is used to read relatively large data (for example, first data), the memory controller 106 may send, to the media controller in the NVDIMM 108, at least two send commands that are used to read fixed-length (for example, the third length) data. The third length is less than a first length of the first data. The media controller 110 may return at least two data subblocks of the third length and metadata to the memory controller 106 based on the at least two received send commands. Metadata corresponding to each data subblock includes a location identifier of the data subblock in the first data. Therefore, the memory controller 106 may combine the at least two data subblocks into the first data based on returned location identifiers in the metadata of the at least two data subblocks. The method provided in this embodiment of the present disclosure can support a read requirement for reading data with different length without increasing a quantity of read commands and without wasting bus bandwidth.

In actual application, because the computer system 100 may concurrently process a plurality of different read commands, in this manner, data to be read by a plurality of read commands may be temporarily stored in the buffer 134 of the NVDIMM 108. In actual application, when data is stored in the buffer 134, the media controller 110 sends a ready signal to the memory controller 106 to instruct the memory controller 106 to obtain data. To reduce a wait delay in obtaining data by the memory controller, in this embodiment of the present disclosure, a scheduling sequence of data blocks in the buffer may be further optimized. The following describes, in detail with reference to FIG. 5 and FIG. 7, how the computer system 100 provided in the embodiments of the present disclosure reduces the wait delay in obtaining data by the memory controller.

In this embodiment of the present disclosure, to reduce the wait delay in obtaining data by the memory controller, a transmission identifier (LB) may be further added to the metadata shown in FIG. 5. The transmission identifier LB occupies only one bit in the metadata shown in FIG. 5. Further, a bit may be selected from unused bits (for example, bits indicated by the RFU in FIG. 5) in the metadata structure shown in FIG. 5 as the transmission identifier. The transmission identifier is used to indicate whether the data subblock is a last to-be-transmitted data block in data to be read by a read command indicated by a RID. For example, when the first data is divided into at least two data subblocks for storing, any one of the at least two data subblocks may be used as the last to-be-transmitted data subblock of the first data. In this manner, an LB bit in metadata of the determined last to-be-transmitted data subblock may be marked as "1", and an LB bit in metadata of another data subblock in the first data may be marked as 0. It may be understood that, "1" is merely an example that is used to indicate that the data subblock is an identifier of the last to-be-transmitted data subblock, and "0" is also merely an example that is used to indicate that the data subblock is not an identifier of the last to-be-transmitted data subblock. Another identifier may alternatively be used in actual application, and no limitation is imposed herein.

Figure 7:
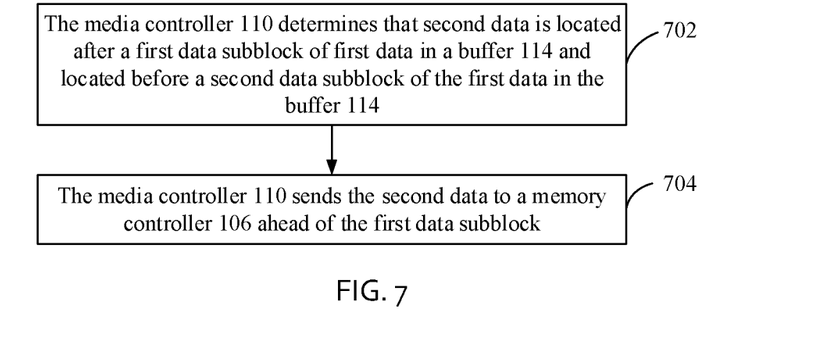
FIG. 7 is a flowchart of a scheduling method according to an embodiment of the present disclosure.
Figure 8:
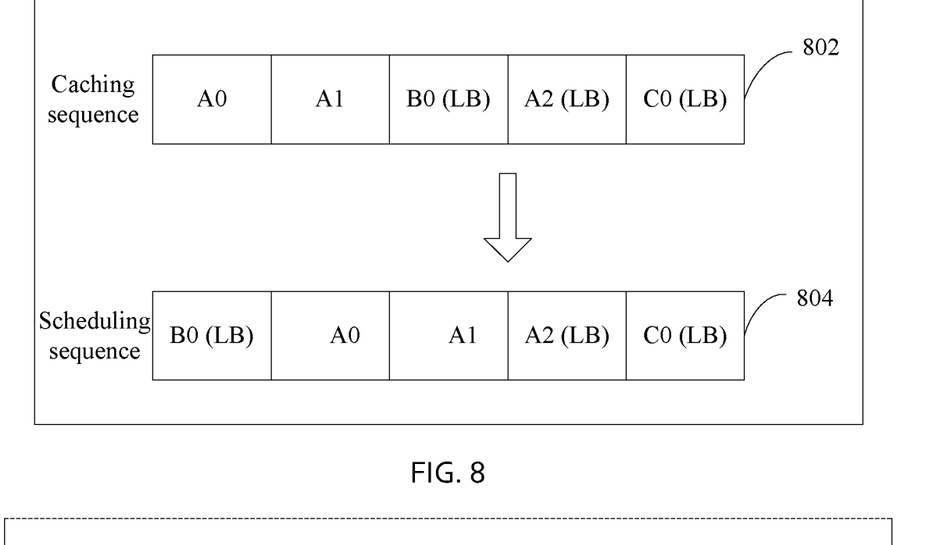
FIG. 8 is a schematic diagram of a scheduling method according to an embodiment of the present disclosure.
Figure 9:
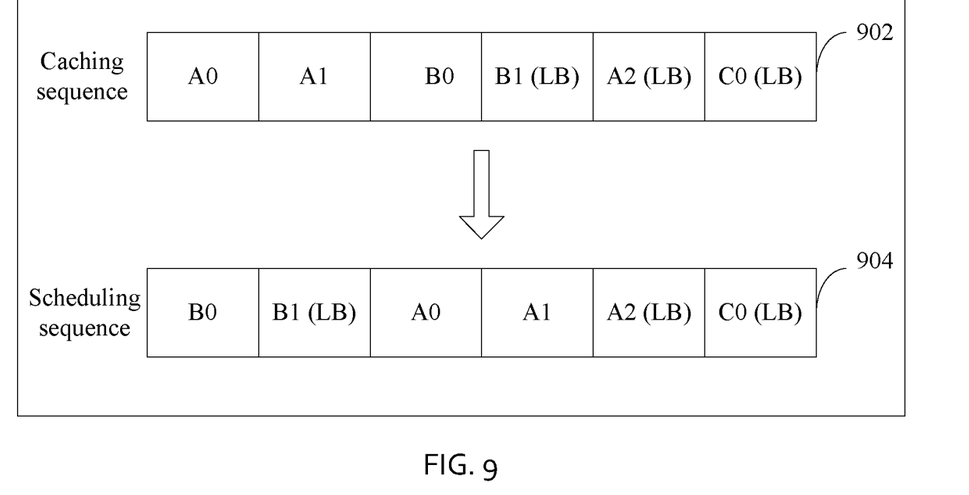
FIG. 9 is a schematic diagram of another scheduling method according to an embodiment of the present disclosure.

In the embodiments of the present disclosure, to reduce a wait delay in receiving data of a read command by the memory controller 106, in step 212 shown in FIG. 2 and step 612 shown in FIG. 6, the media controller 110 may further optimize a sequence for returning data subblocks, stored in the buffer 114, of read commands. The following describes, in detail with reference to FIG. 7 to FIG. 9, how the media controller 110 in the embodiments of the present disclosure returns a data block to the memory controller 106. FIG. 7 is a flowchart of a scheduling method according to an embodiment of the present disclosure. FIG. 8 is a schematic diagram of a scheduling method according to an embodiment of the present disclosure. FIG. 9 is a schematic diagram of another scheduling method according to an embodiment of the present disclosure. For clarity of description, that at least two data subblocks of first data and second data are temporarily stored in a buffer 114 in the embodiment shown in FIG. 7 is used as an example for description. As shown in FIG. 7, when returning a data block to a memory controller 106, a media controller 110 may perform the following steps.

Step 702: The media controller 110 determines that second data is located after a first data subblock of first data in the buffer 134 and located before a second data subblock of the first data in the buffer 114. A transmission identifier of the first data subblock indicates that the first data subblock is not a last to-be-transmitted data subblock of the first data, and a transmission identifier of the second data subblock indicates that the second data subblock is a last to-be-transmitted data subblock of the first data.

For clarity of description, an example is used for description with reference to FIG. 8. As shown in FIG. 8, a first read command A and a second read command B are used as an example. Data to be read by the first read command A includes a data subblock A0, a data subblock A1, and a data subblock A2 (LB), and data to be read by the second read command B includes a data subblock B0 (LB). A2 (LB) is used to indicate that A2 is a last to-be-transmitted data subblock of the data that is read by the first read command A, and B0 (LB) is used to indicate that B0 is a last to-be-transmitted data subblock of the data that is read by the second read command B. A buffering sequence of the data subblocks in the buffer 134 is shown in 802. The data subblock B0 (LB) is located after the data subblock A0 and the data subblock A1 and located before the data subblock A2 (LB).

Step 704: The media controller 110, in response to a send command sent by the memory controller 106, sends the second data to the memory controller 106 ahead of the first data subblock. Further, as shown by a scheduling sequence 804 in FIG. 8, the media controller 110 may first respond to one send command sent by the memory controller 106 to send the second data B0 (LB) to the memory controller 16, and then respond to at least two other send commands sent by the memory controller 16 to return the first data subblock A0, the second data subblock A1, and the third data subblock A2 (LB) to the memory controller 106.

It is assumed that a transmission delay in transmitting one data subblock is four periods. If the media controller 110 sends the data subblocks to the memory controller 106 based on the buffering sequence shown by 802 in FIG. 8, a wait delay in receiving all data subblocks of the first read command A by the memory controller 16 is 16 periods, and a wait delay in receiving all data subblocks of the second read command B by the memory controller 16 is 12 periods. To reduce a wait delay of the memory controller 16, after a sending sequence of the data subblocks in the buffer 134 is adjusted according to the method shown in this embodiment of the present disclosure, for example, based on the scheduling sequence shown by 804, the media controller 110 may send the data B0 (LB) of the second read command B to the memory controller 106 ahead of the data subblocks A0 and A1 of the first read command A. In this case, the wait delay in receiving all the data subblocks of the first read command A by the memory controller 106 is unchanged, and is still 16 periods. However, the wait delay in receiving all the data subblocks of the second read command B by the memory controller 106 is four periods, thereby reducing the delay in receiving the data subblock of the second read command B by the memory controller 106, and improving processing efficiency in processing the second read command B by the memory controller 106.

That data to be read by a second read command includes only one data subblock B0 (LB) is used as an example for description in FIG. 8. In an application, if the data to be read by the second read command includes a plurality of data subblocks, provided that each data subblock to be read by the second read command is located after a data subblock in data to be read by a first read command in a buffer and is located before a last to-be-transmitted data subblock of the data to be read by the first read command in the buffer, the media controller 110 may send the data subblock to be read by the second read command to the memory controller 106 ahead of the data subblock to be read by the first read command. As shown by 902 in FIG. 9, data to be read by a second read command B includes B0 and B1 (LB). B0 and B1 (LB) are located after a data subblock A0 to be read by a first read command A in a buffer 114, and B0 and B1 (LB) are located before a last to-be-transmitted data subblock A2 (LB) of data to be read by the first read command A in the buffer 114. A media controller 110 may send data subblocks to the memory controller 16 based on a scheduling sequence shown in 904. Further, the data B0 and B1 (LB) to be read by the second read command may be sent to the memory controller ahead of the data subblock A0 to be read by the first read command A. That a transmission delay in transmitting one data subblock is four periods is still used as an example. After a sending sequence is adjusted, a delay in receiving, by the memory controller 106, data that is read by the second read command B is reduced from 16 periods to eight delays, and a delay in receiving, by the memory controller 106, data that is read by the first read command A is still 20 delays. Therefore, processing efficiency of the memory controller is optimized to some extent.

In addition, in consideration of fairness, to avoid an increase in a delay in receiving data of a read command by the memory controller 106, in this embodiment of the present disclosure, the media controller 110 cannot send, to the memory controller ahead of the data subblock of the first read command, a data subblock to be read by another read command that is located after the last to-be-transmitted data subblock of the data of the first read command in the buffer. For example, as shown in FIG. 8 and FIG. 9, a data subblock C0 (LB) of a third read command C is located after the data subblock A2 (LB) of the first read command A in the buffer 114, and the media controller no cannot send the C0 (LB) to the memory controller 106 ahead of the data subblocks A0, A1, and A2 (LB) of the first read command. If the media controller no sends the C0 (LB) to the memory controller 106 ahead of the data subblocks A0, A1, and A2 (LB) of the first read command, a delay in receiving a data block of the first read command A by the memory controller 106 increases. For example, in the example shown in FIG. 8, assuming that a data subblock of the first read command A is sent after the data subblock of the third read command C is sent, a delay in receiving the data of the first read command A by the memory controller 106 increases from 16 periods to 20 periods.

It should be noted that, in this embodiment of the present disclosure, when the media controller no adjusts a sending sequence of data blocks, a last to-be-transmitted data block in data that is read by a read command cannot be sent ahead of another data block of the command. For example, the media controller no cannot send the data subblock A2 (LB) of the first read command to the memory controller 106 ahead of the data subblock A0 or A1.

It may be learned from the foregoing description that, based on the methods in FIG. 2 and FIG. 6 in the embodiments of the present disclosure, in a process of returning read data to the memory controller 106 by the media controller 110, a returning sequence of data that is read by read commands is adjusted such that read commands for reading data with different length can be processed, and further a delay in receiving data by the memory controller 106 can be reduced, thereby improving processing efficiency of the memory controller 106.

A person of ordinary skill in the art may be aware that, with reference to the examples described in the embodiments disclosed in this specification, method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable and an optical fiber) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), or a non-transitory machine-readable medium such as a semiconductor medium (for example, a solid-state drive (SSD)) that can store program code.

It should be noted that, the embodiments provided in this application are merely examples. A person skilled in the art may clearly know that, for convenience and conciseness of description, in the foregoing embodiments, the embodiments emphasize different aspects, and for a part not described in detail in one embodiment, refer to relevant description of another embodiment. Features disclosed in the embodiments of the present disclosure, claims, and accompanying drawings may exist independently, or exist in a combination. Features described in a hardware form in the embodiments of the present disclosure may be executed by software, and vice versa, which is not limited herein.

The invention claimed is:

1. A computer system, comprising:
   a memory controller;

a non-volatile dual in-line memory module (NVDIMM) connected to the memory controller by a bus, the NVDIMM having a non-volatile memory (NVM) for storing data and a media controller;

the memory controller being configured to:
send, to the media controller of the NVDIMM, a read command for reading first data stored in the NVDIMM, the first data comprising multiple data subblocks, wherein the read command comprises an identifier identifying the read command;
receive, from the media controller, multiple ready signals, each of the multiple ready signals notifying the memory controller that one of the multiple data subblocks of the first data is available;
send, to the media controller, multiple send commands for fetching the multiple data subblocks, each of the multiple send commands being in response to one of the multiple ready signals; and
receive, from the media controller, the multiple data subblocks of the first data, wherein each of the multiple data subblocks is received with the identifier identifying the read command.

2. The computer system of claim 1, wherein the memory controller is further configure to receive, from the media controller, metadata of the multiple data subblocks, wherein metadata of each of the multiple data subblocks comprises a location ID indicating an offset of a corresponding data subblock in the first data.

3. The computer system of claim 2, wherein the location ID occupies three bits.

4. The computer system of claim 1, wherein the memory controller communicates with the media controller by complying with a bus access protocol compatible with a double data rate (DDR) bus protocol.

5. The computer system of claim 1, wherein the memory controller communicates with the media controller by complying with a NVDIMM-P bus protocol.

6. The computer system of claim 1, wherein size of each of the multiple data subblocks is 64 byte.

7. The computer system of claim 1, further comprising:
a buffer coupled to the NVM and configured to temporarily store the multiple data subblocks of the first data and a second data read from the NVM, wherein a size of the second data is equal to a size of one of the multiple data subblocks of the first data, and
wherein the media controller is configured to send the second data to the memory controller before sending a first data subblock of the first data in the buffer when the second data is located after the first data subblock of the first data in the buffer and before a second data subblock of the first data in the buffer, wherein the second data subblock is the last to-be-transmitted data subblock of the first data.

8. A non-volatile dual in-line memory module (NVDIMM), comprising:
a non-volatile memory (NVM) for storing data; and
a media controller coupled to the NVM and configured to:
receive, from a memory controller of a computer system, a read command for reading first data stored in the NVM, the first data comprising multiple data subblocks, wherein the read command comprises an identifier identifying the read command;
send, to the memory controller, multiple ready signals to notify the memory controller that multiple data subblocks of the first data are available, each of the multiple ready signals corresponding to one of the multiple data blocks;
receive, from the memory controller, multiple send commands for fetching the multiple data subblocks, each of the multiple send command being in response to one of the multiple ready signals; and
send, in response to the multiple send commands, the multiple data subblocks to the memory controller, wherein each of the multiple data subblocks is sent with the identifier identifying the read command.

9. The NVDIMM of claim 8, further comprising a buffer coupled to the media controller and configured to temporarily store the multiple data subblocks of the first data read from the NVM.

10. The NVDIMM of claim 9, wherein the buffer is further configured to temporarily store a second data read from the NVM according to another read command, wherein a size of the second data is equal to a size of one of the multiple data subblocks of the first data; and
wherein the media controller is further configured to send the second data to the memory controller before sending a first data subblock of the first data in the buffer when the second data is located after the first data subblock of the first data in the buffer and before a second data subblock of the first data in the buffer, wherein the second data subblock is the last to-be-transmitted data subblock of the first data.

11. The NVDIMM of claim 8, wherein the media controller is further configured to:
send, in response to the multiple send commands, metadata of the multiple data subblocks to the memory controller, wherein metadata of each of the multiple data subblocks comprises a location ID indicating an offset of a corresponding data subblock in the first data.

12. The NVDIMM of claim 11, wherein the location ID occupies three bits.

13. The NVDIMM of claim 8, wherein the NVDIMM communicates with the memory controller by complying with a bus access protocol compatible with a double data rate (DDR) bus protocol.

14. The NVDIMM of claim 8, wherein the NVDIMM communicates with the memory controller by complying with a NVDIMM-P bus protocol.

15. The NVDIMM of claim 8, wherein size of each of the multiple data subblocks is 64 byte.

16. A memory access method performed by a memory controller in a computer system, comprising:
sending, to a media controller of a non-volatile dual in-line memory module (NVDIMM) connected to the memory controller, a read command for reading first data stored in a non-volatile memory (NVM) of the NVDIMM, the first data comprising multiple data subblocks, wherein the read command comprises an identifier identifying the read command;
receiving, from the media controller, multiple ready signals, each of the multiple ready signals notifying the memory controller that one of the multiple data subblocks of the first data is available;
sending, to the media controller, multiple send commands for fetching the multiple data subblocks, each of the multiple send commands being in response to one of the multiple ready signals; and
receiving, from the media controller, the multiple data subblocks of the first data, wherein each of the multiple data subblocks is received with the identifier identifying the read command.

17. The memory access method of claim 16, further comprising:

receiving, from the media controller, metadata of the multiple data subblocks, wherein metadata of each of the multiple data subblocks comprises a location ID indicating an offset of a corresponding data subblock in the first data.

18. The memory access method of claim 17, wherein the location ID occupies three bits.

19. The memory access method of claim 16, wherein the memory controller communicates with the media controller by complying with a bus access protocol compatible with a double data rate (DDR) bus protocol.

20. The memory access method of claim 16, wherein the memory controller communicates with the media controller by complying with a NVDIMM-P bus protocol.

21. The memory access method of claim 16, wherein size of each of the multiple data subblocks is 64 byte.

22. A memory access method performed by a media controller of a non-volatile dual in-line memory module (NVDIMM), comprising:
  receiving, from a memory controller connected to the NVDIMM, a read command for reading first data stored in a non-volatile memory (NVM) of the NVDIMM, the first data comprising multiple data subblocks, wherein the read command comprises an identifier identifying the read command;
  sending, to the memory controller, multiple ready signals to notify the memory controller that multiple data subblocks of the first data are available, each of the multiple ready signals corresponding to one of the multiple data blocks;
  receiving, from the memory controller, multiple send commands for fetching the multiple data subblocks, each of the multiple send command being in response to one of the multiple ready signals; and
  sending, in response to the multiple send commands, the multiple data subblocks to the memory controller, wherein each of the multiple data subblocks is sent with the identifier identifying the read command.

23. The memory access method of claim 22, further comprising:
  receiving, from the memory controller, another read command for reading second data stored in the NVM, wherein a size of the second data is equal to a size of one of the multiple data subblocks of the first data;
  sending, to the memory controller, another ready signal to notify the memory controller that the second data is available;
  receiving, from the memory controller, another send command for fetching the second data;
  sending the second data to the memory controller before sending the first data subblock, wherein the second data read from the NVM is located after a first data subblock of the first data in a buffer of the NVDIMM and before a second data subblock of the first data in the buffer, and wherein the second data subblock is the last to-be-transmitted data subblock of the first data.

24. The memory access method of claim 22, further comprising:
  sending, in response to the multiple send commands, metadata of the multiple data subblocks to the memory controller, wherein metadata of each of the multiple data subblock comprises a location ID indicating an offset of a corresponding data subblock in the first data.

25. The memory access method of claim 24, wherein the location ID occupies three bits.

26. The memory access method of claim 22, wherein the NVDIMM communicates with the memory controller by complying with a bus access protocol compatible with a double data rate (DDR) bus protocol.

27. The memory access method of claim 22, wherein the NVDIMM communicates with the memory controller by complying with a NVDIMM-P bus protocol.

28. The memory access method of claim 22, wherein size of each of the multiple data subblocks is 64 byte.

* * * * *